US011070563B2

(12) United States Patent
Irazabal (10) Patent No.: US 11,070,563 B2
(45) Date of Patent: Jul. 20, 2021

(54) TRACE-BASED TRANSACTION VALIDATION AND COMMITMENT

(71) Applicant: International Business Machines Corporation, Armonk, NY (US)

(72) Inventor: Jeronimo Irazabal, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/032,271

(22) Filed: Jul. 11, 2018

(65) Prior Publication Data
US 2020/0021602 A1 Jan. 16, 2020

(51) Int. Cl.
G06F 21/00 (2013.01)
H04L 29/06 (2006.01)
G06F 21/64 (2013.01)
H04L 9/06 (2006.01)
H04L 29/08 (2006.01)
H03M 7/30 (2006.01)
H04L 12/24 (2006.01)

(52) U.S. Cl.
CPC ............. *H04L 63/12* (2013.01); *G06F 21/64* (2013.01); *H03M 7/30* (2013.01); *H04L 9/0637* (2013.01); *H04L 41/145* (2013.01); *H04L 67/104* (2013.01); *H04L 2209/38* (2013.01)

(58) Field of Classification Search
CPC ..... H04L 63/12; H04L 9/0637; H04L 41/145; G06F 21/64
See application file for complete search history.

(56) References Cited

U.S. PATENT DOCUMENTS

| 9,635,000 B1 | 4/2017 | Muftic | |
| 2001/0003099 A1* | 6/2001 | Von Kohorn | H04N 7/0884 463/40 |
| 2012/0185675 A1* | 7/2012 | Kim | G06F 9/30072 712/216 |
| 2017/0155515 A1 | 6/2017 | Androulaki et al. | |
| 2017/0232300 A1 | 8/2017 | Tran et al. | |
| 2018/0046766 A1* | 2/2018 | Deonarine | G06F 19/326 |
| 2019/0079998 A1* | 3/2019 | Rush | G06F 16/335 |
| 2019/0205558 A1* | 7/2019 | Gonzales, Jr. | G06F 16/1805 |
| 2019/0206565 A1* | 7/2019 | Shelton, IV | G16H 40/63 |
| 2020/0012779 A1* | 1/2020 | Chandrasekaran | G06F 21/64 |

OTHER PUBLICATIONS

Al-Bassam, M. et al.; "Chainspace: A Sharded Smart Contracts Platform"; arXiv: 1708.03778v1; University College London, UK.; Aug. 12, 2017.

(Continued)

*Primary Examiner* — Jeffrey C Pwu
*Assistant Examiner* — Rodman Alexander Mahmoudi (57) ABSTRACT

One example embodiment may provide a system for trace-based transaction validation and commitment in a network. The system includes at least one endorser peer and at least one committer peer. The at least one endorser peer is configured to generate a binary trace during simulation of a transaction, resulting in an endorsed trace. The at least one committer peer is configured to validate the transaction by executing a smart contract and using the endorsed trace as a witness.

19 Claims, 7 Drawing Sheets

(56) References Cited

OTHER PUBLICATIONS

Hardjono, T. et al.; "Anonymous Identities for Permissioned Blockchains"; MIT Internet Trust Consortium, hardjono@mit.edu. Jan. 20, 2016.

Li, A. et al.; "A Blockchain for Network Function Workflow Validation Using Forward Prediction"; http://ip.com/IPCOM/000250638D; Aug. 11, 2017.

Rao, LP. et al.; "Efficient Path Characteristics Orchestration for Blockchain Applications"; http://ip.com/IPCOM/000250842D; Sep. 8, 2017.

Yang, Y. et al.; "Mechanisms for Validating Authorization/Delegation Hierarchy Using Blockchain Technology"; http://ip.com/IPCOM/000248695D; Dec. 27, 2016.

* cited by examiner

TRACE-BASED TRANSACTION VALIDATION AND COMMITMENT

TECHNICAL FIELD

This application generally relates to transaction management, and more particularly, to concurrency control solutions that employ trace-based transaction validation and commitment.

BACKGROUND

Multi-version concurrency control is used in Hyperledger Fabric v1 to validate endorsed transactions. Endorser peers simulate transaction proposals and the list of keys, and their corresponding committed version read during the simulation is included in the result. This information is then used at commit time to determine whether a transaction is valid or has been invalidated by a previous committed transaction by writing one of the keys read by the transaction being validated. The transaction is the execution of the smart contract. Generally speaking, when a smart contract is executed, new key values are generated for at least some keys of the smart contract. For example, a transaction may be to change the ownership of a modeled asset. As part of the smart contract, one or more conditional statements (i.e., conditions) may exist. Given a statement, if a condition holds, one set of statements will be executed, and another set of statements will be executed if the condition does not hold.

While this model ensures the state remains consistent, it is a conservative approach that may invalidate transactions that could be processed using a different concurrency control solution. For instance, the current concurrency control of Hyperledger Fabric v1 invalidates a transaction that increases a value if the committed version of the key and version read during simulation do not match. Some simple scenarios, such as the one described, could be handled using the multi-version concurrency control approach. However, more complex scenarios will invalidate more transactions. For instance, if the new value does not affect what the smart contract will do, the smart contract will still be invalidated. This is the case of transactions on the value of a key (e.g., greater than a certain value). Accordingly, an improved concurrency control solution that overcomes these deficiencies may be beneficial.

SUMMARY

Certain embodiments of the present invention may provide solutions to the problems and needs in the art that have not yet been fully identified, appreciated, or solved by conventional concurrency control technologies. For example, some embodiments of the present invention pertain to concurrency control solutions that employ trace-based transaction validation and commitment.

One example embodiment may provide a system for trace-based transaction validation and commitment in a network. The system includes at least one endorser peer and at least one committer peer. The at least one endorser peer is configured to generate a binary trace during simulation of a transaction, resulting in an endorsed trace. The at least one committer peer is configured to validate the transaction by executing a smart contract and using the endorsed trace as a witness.

Another example embodiment may provide a method for trace-based transaction validation and commitment in a network. The method includes generating a binary trace during simulation of a transaction, by at least one endorser peer, resulting in an endorsed trace. The method also includes validating the transaction, by at least one committer peer, by executing a smart contract and using the endorsed trace as a witness. When the validation of the transaction by the at least one committer peer fails, the method includes invalidating the transaction, by the at least one committer peer. When the execution of the smart contract by the at least one committer peer finishes successfully, the method includes committing changes in the transaction to a ledger, by the committer peer.

A further example embodiment may provide a method for trace-based transaction validation and commitment in a network. The method includes generating a binary trace during simulation of a transaction, by at least one endorser peer, resulting in an endorsed trace. The method also includes reducing a length of the binary trace using a length reduction technique, by the at least one endorser peer, and validating the transaction, by at least one committer peer, by executing a smart contract and using the endorsed trace as a witness. When the evaluation of the transaction by the at least one committer peer fails, the method includes invalidating the transaction, by the at least one committer peer. When the execution of the smart contract by the at least one committer peer finishes successfully, the method includes committing changes in the transaction to a ledger, by the committer peer.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems that provide concurrency control solutions that employ trace-based transaction validation and commitment.

A blockchain is a distributed system that includes multiple nodes that communicate with each other. A blockchain operates programs called "chaincode" (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions that are not endorsed are disregarded. There may exist one or more special chaincodes for management functions and parameters, collectively called "system chaincodes."

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node that submits a transaction-invocation to an endorser (e.g., a peer), and broadcasts transaction-proposals to an ordering service (e.g., an ordering node). Another type of node is a peer node that can receive client submitted transactions, commit the transactions, and maintain a state and a copy of the ledger of blockchain transactions. Peer nodes (or peers) can also have the role of an endorser, although this is not a requirement. An ordering-service-node, or orderer node, is a node running the communication service for all nodes. The orderer node implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) that is used to store an immutable, sequenced record in blocks. The ledger also includes a state database that maintains a current state of the blockchain. There is typically one ledger per channel. Each peer node maintains a copy of the ledger for each channel of which they are a member.

A distributed ledger is a ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), and/or verifiability (all transactions can be cryptographically verified). A blockchain is an example of a CDL. While the description and figures herein are described in terms of a blockchain, the subject application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer, and verify information. Since blockchain is a distributed system, before adding a transaction to the blockchain ledger, all peers typically need to reach a consensus status.

A chain is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Whenever a transaction is committed into the ledger and the state is updated based on the transaction results, a timestamp is calculated for the updated keys based on the order in which such transaction was stored. If, however, the smart contract involves more keys that are not modified in the current transaction, a modification is not made to those keys.

Some embodiments provide a less restrictive concurrency control approach applicable to any smart contract. This novel approach can complement the multi-version control approach, and even coexist with an assertion-based validation and commitment approach for transactions with conditions. In some embodiments, a trace-based approach is not used for all transactions. Rather, a user may specify the concurrency control approach that is desired. Indeed, a novel aspect of some embodiments is providing users with the ability to select a concurrency control approach, or to employ more than one concurrency control approach.

Some embodiments capture the result of the execution of conditions during the simulation phase of a transaction in the form of a binary trace. Consider the example where during simulation of a transaction, ownership to be changed. If the committer peer determines that the conditions in the transaction hold, the ownership will be changed. However, if a condition in the transaction does not hold, the transaction will be invalidated and ownership will not be changed. As an example of a condition, the change in ownership may be based on an amount of money that a user has. For instance, the condition may be to change ownership if the user has at least $100,000, and if not, then the transaction does not hold. However, any suitable conditions may be used without deviating from the scope of the invention. Indeed, in a general sense, conditions are logical tests that must be met for a transaction to be committed.

In a typical transaction, the transaction is first simulated and then sent for ordering. In the interim, other transactions could be entered. As such, there is no guarantee that when the order is established, the state of the transaction will be the same as during simulation. To address this issue, version control may be employed. However, a problem with this multi-version approach is that it will invalidate transactions that otherwise would be permitted.

The general idea of some embodiments includes generating a binary trace during simulation of the transaction. The binary trace indicates whether a given set of conditions in a smart contract hold during simulation. A single transaction may have many conditions, and a binary value may be used to represent each condition therein. Peers will use this trace to validate the transaction in some embodiments by checking whether the trace matches each condition that is being validated. If there is a mismatch (i.e., the state of the blockchain is different), then the transaction fails. In reality, this means that another transaction has changed the state of the blockchain such that the transaction that is being validated has a different value. The states during validation and endorsing may be different due to another transaction being committed.

A binary value of 1 is set when a condition holds in some embodiments, and the value is set to 0 otherwise (or vice versa). Thus, tracing of all of the branches is executed at simulation time. In some embodiments, each time that a conditional statement is executed during simulation, a 0 or a 1 is added to the trace. The committer peers use that trace as a witness to check whether the conditions have the same result when committing the transaction as happened during simulation. Endorser peers generate the trace, and committer peers commit the trace to the ledger. The committer may compare the trace it receives to the trace it generates. Committer peers may then use the endorsed trace as a witness during validation.

Transactions executed via a blockchain can be computationally expensive because conventionally, every computing system that is part of the network needs to execute the same logic and update the state of the blockchain. In other words, each time a smart contract is triggered, every computing system has to perform the same task, consuming considerable resources and making the process inefficient when compared to parallel processing architectures. Therefore, conventionally, not every conditional transaction will be appropriate for execution via a blockchain, but rather, only those use cases that demand the distributed and secure nature of a shared ledger.

Accordingly, some embodiments employ a less restrictive, trace-based transaction validation and commitment approach, which allows use of conditional blockchain transactions in more complex scenarios. The process of some embodiments is as follows. Endorser peers generate a binary trace during transaction simulation, setting a binary value of 1 when a condition holds and 0 otherwise. Committer peers then validate transactions by executing the smart contract and using the endorsed trace as a witness. When the evaluation of a condition differs from the trace, the transaction is invalidated. When the execution finishes successfully, then the changes can be applied since the transaction was executed in a valid state.

All committers that executed the same sequence of transactions will arrive to the same state. If a committer commits the same sequence of transactions, it will have the same values for all of the keys. A smart contract may have many keys. The collective key values are the state. If all peers execute the same sequence of changes, they will necessarily obtain the same keys, and thus the same state. The trace is not part of the state but is used to validate the incoming transaction.

As the length of the trace depends on the number on conditions being evaluated during simulation, the length can be considerable. Thus, techniques to reduce its length can be employed. These include, but are not limited to, (1) identifying which conditions depend on the state at which the transaction is executed (e.g., if the condition only depends on input provided to the transaction, there is no need to include the result on the trace); and (2) using a compression algorithm on the trace (e.g., the trace 000000111 can be compressed as 6×03×1). In other words, the number of consecutive zeros is 6×0 and the number of consecutive 1s is 3×1. However, any suitable compression algorithm or algorithms may be used without deviating from the scope of the invention.

Figure 1:
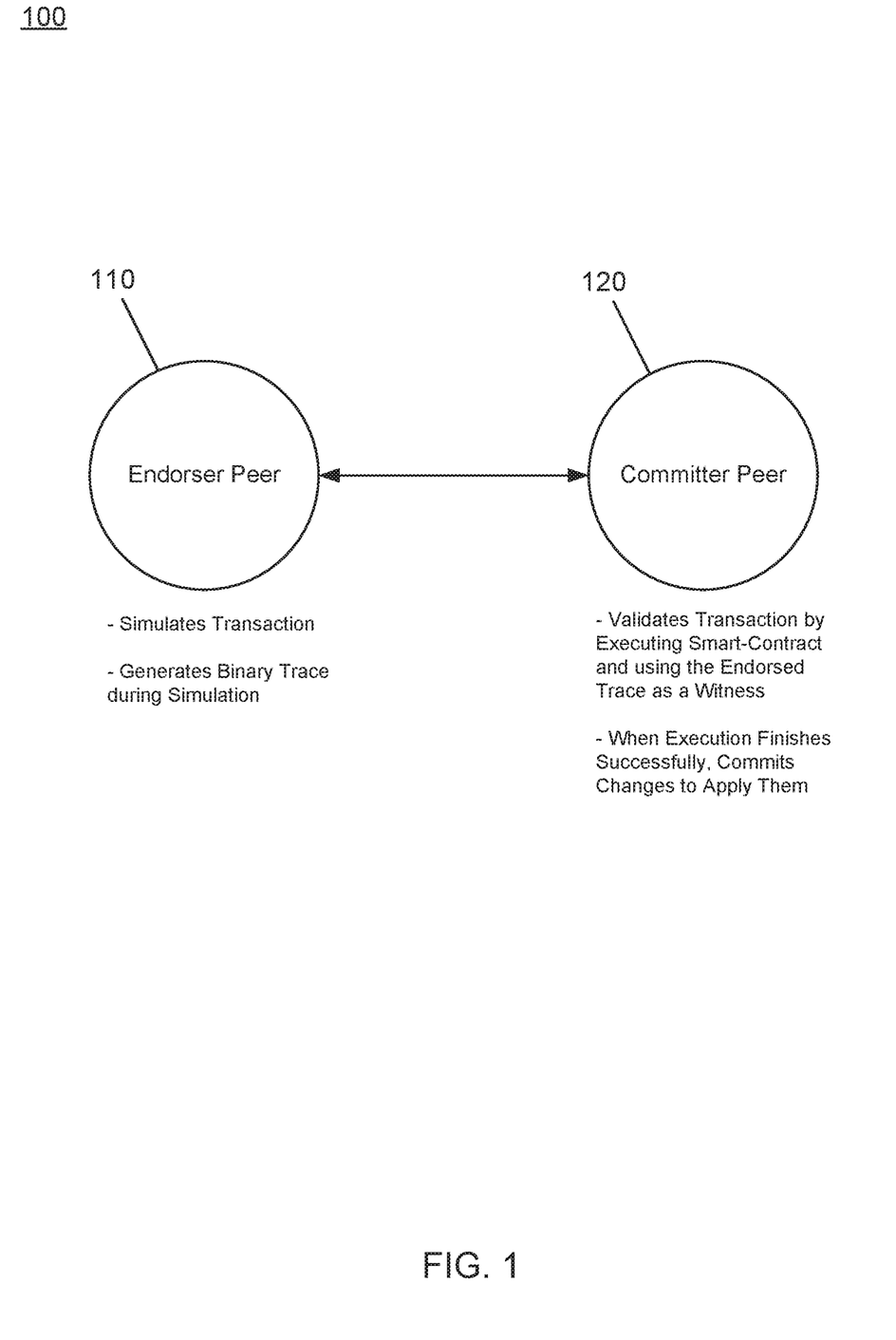
FIG. 1 illustrates a partial blockchain network diagram that includes an endorser peer and a committer peer, according to example embodiments.

FIG. 1 illustrates a partial blockchain network diagram 100 that includes an endorser peer 110 and a committer peer 120, according to example embodiments. While only a single endorser peer 110 and committer peer 120 are shown here for the purposes of illustration, any suitable number of networked endorser peers and committer peers may be used without deviating from the scope of the invention.

An endorser peer, such as endorser peer 110, is responsible for simulating transactions, and in turn, preventing unstable or non-deterministic transactions from passing through the network. A transaction is sent to an endorser peer in the form of a transaction proposal. All endorsing peers are also committing peers (i.e., they write to the ledger) in some embodiments. A committer peer, such as committer peer 120, appends the validated transactions to the channel-specific ledger. While a peer can act as both an endorser and committer in some embodiments, committer peer 120 may only serve as a committer in certain embodiments.

In FIG. 1, endorser peer 110 generates a binary trace during transaction simulation that includes one or more conditions, setting a binary value of 1 when a condition holds and 0 otherwise. This produces an endorsed trace. Committer peer 120 then validates the transaction by executing the smart contract and using the endorsed trace as a witness (i.e., comparing its trace to the endorsed trace to check whether they match). When the evaluation of a condition differs from the endorsed trace, committer peer 120 invalidates the transaction. When the execution finishes successfully, then the changes can be applied since the transaction was executed in a valid state. In other words, committer peer 120 can then commit the changes to the ledger to apply them.

Figure 2:
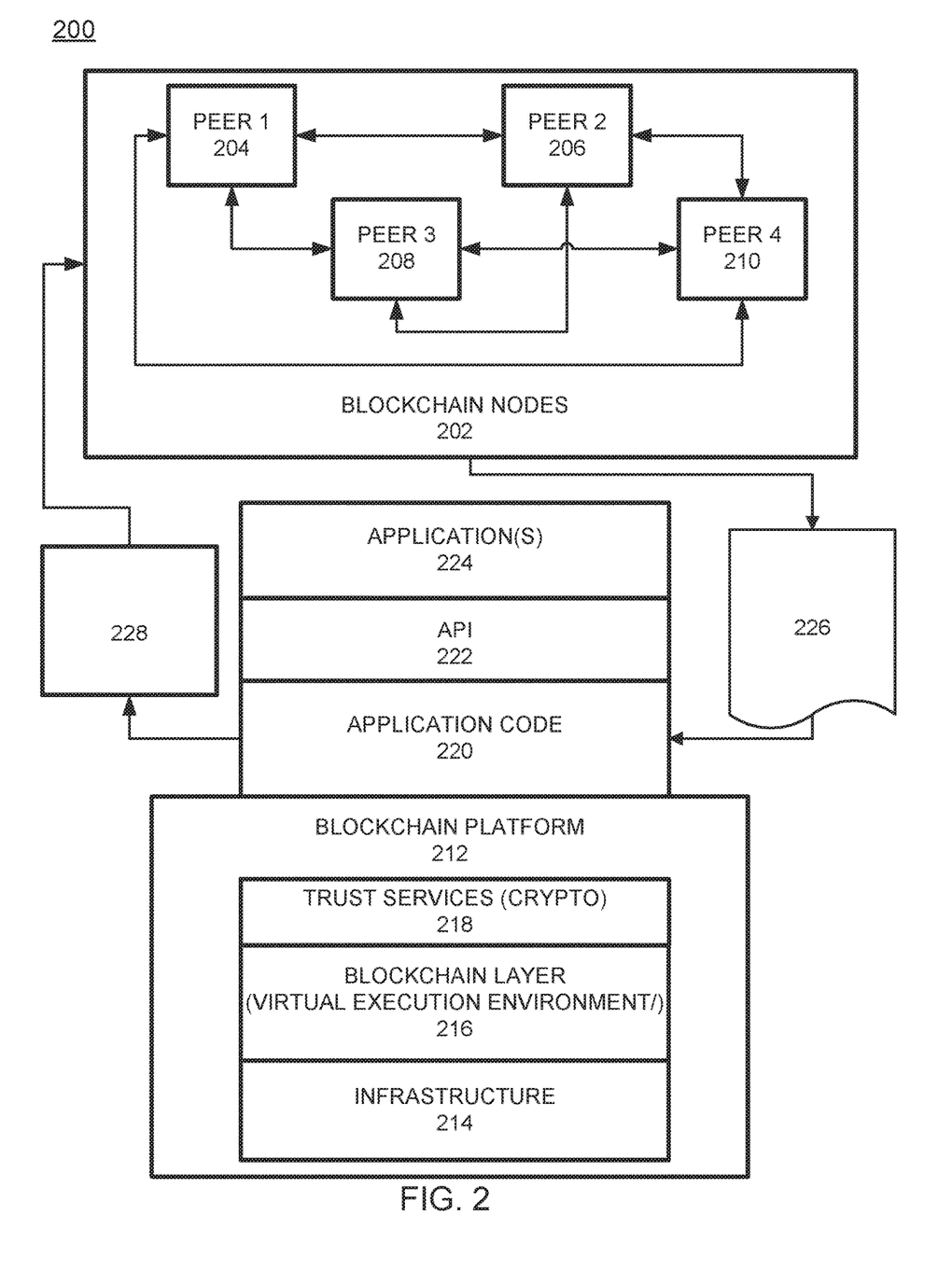
FIG. 2 illustrates an example peer node blockchain architecture configuration for an asset sharing scenario, according to example embodiments.

FIG. 2 illustrates a blockchain architecture configuration 200, according to example embodiments. The blockchain architecture 200 may include certain blockchain elements, for example, a group of blockchain nodes 202. The blockchain nodes 202 may include one or more nodes 204-210 (4 nodes are depicted here by example only). These nodes participate in a number of activities, such as blockchain transaction addition and the validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include applications 224, which are linked to application programming interfaces (APIs) 222 to access and execute stored program/application code 220 (e.g., chaincode, smart contracts, etc.) and can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2 may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, information 226 pertinent to providing a one-step transaction submission in a blockchain network where committed transactions had to fulfill a policy may be processed by one or more processing entities (e.g., virtual machines) included in the blockchain layer 216. The result 228 may include information indicating that a number of peers agree on the transaction results. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 3:
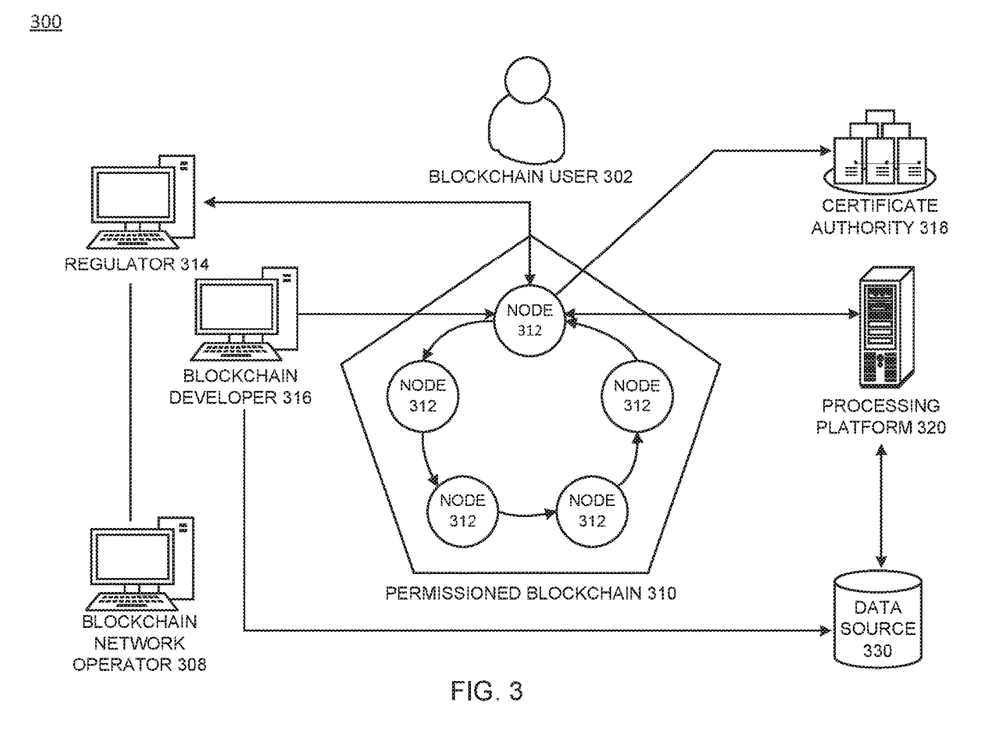
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
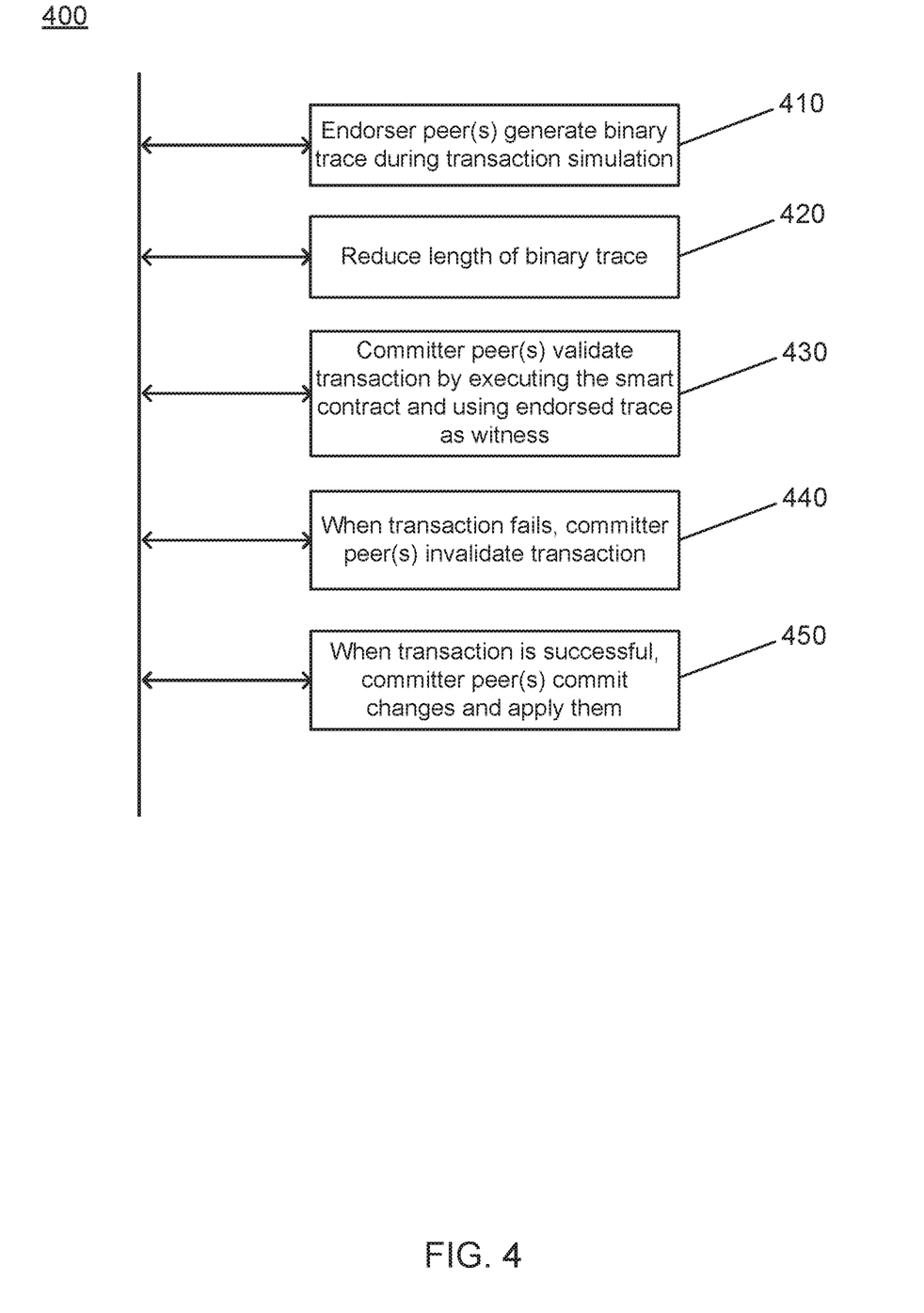
FIG. 4 illustrates a flow diagram of an example method for trace-based transaction validation and commitment, according to example embodiments.

FIG. 4 illustrates a flow diagram of an example method 400 for trace-based transaction validation and commitment, according to example embodiments. The process begins with at least one endorser peer generating a binary trace during transaction simulation at 410. The endorser peer(s) set a binary value of 1 for each condition in the binary trace for the transaction when a given condition holds, and 0 otherwise. In some embodiments, the binary values may be reversed (i.e., 0 when a condition holds, and 1 otherwise).

Per the above, the length of the trace may be considerable. Thus, one or more techniques to reduce the length of the binary trace are employed at 420. For instance, conditions that depend on the state at which the transaction is executed may be identified and unnecessary results may be removed from the trace, and/or a compression algorithm may be used on the trace, etc.

At least one committer peer then validates the transaction at 430 by executing the smart contract and using the endorsed trace as a witness. When the evaluation of a condition differs from the endorsed trace at 440, the committer peer(s) invalidate the transaction. When the execution finishes successfully at 450, then the changes can be applied since the transaction was executed in a valid state. In other words, the committer peer(s) then commit the changes to the ledger to apply them.

Figure 5A:
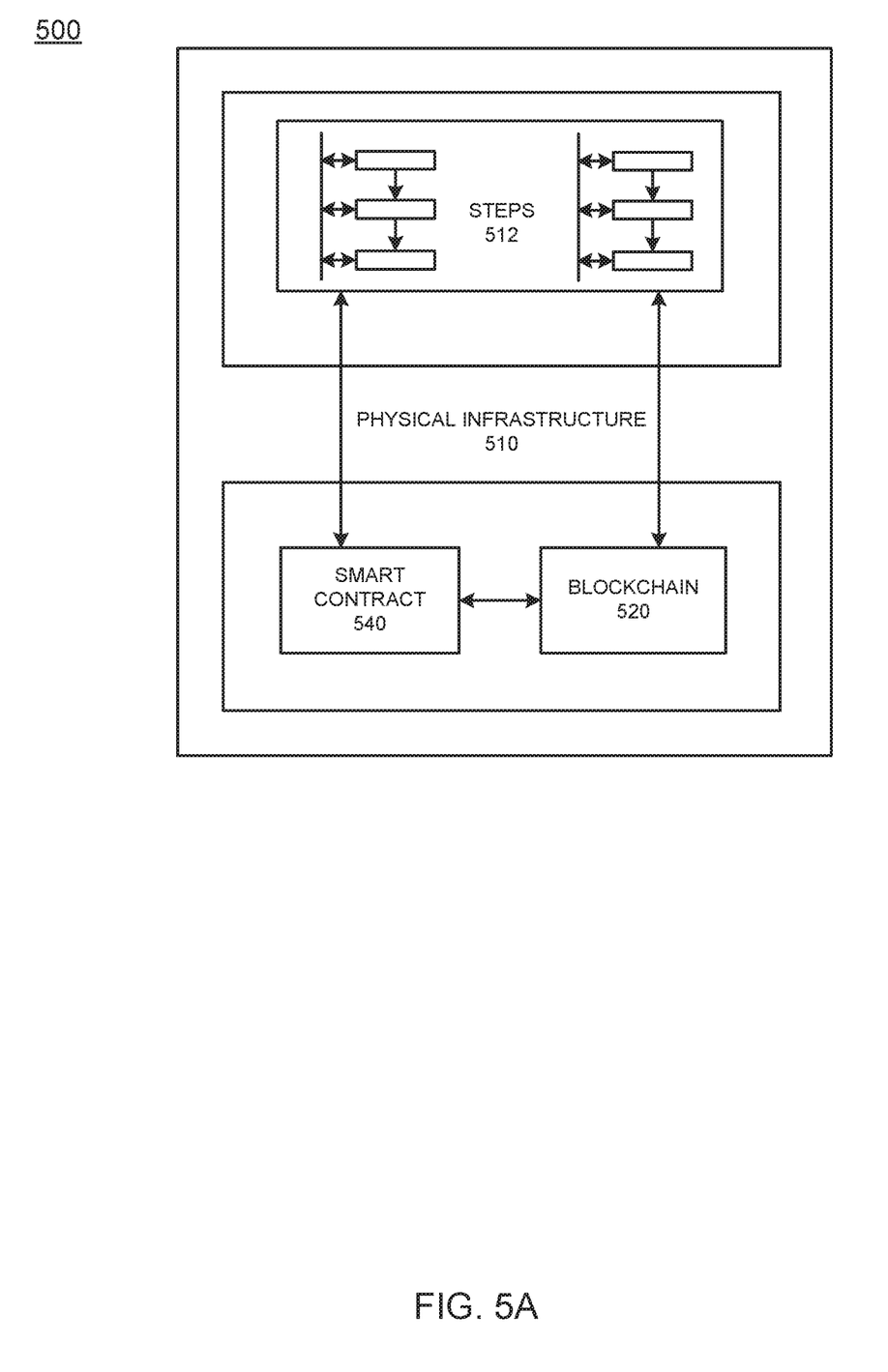
FIG. 5A illustrates an example physical infrastructure configured to perform various operations on the blockchain in accordance with one or more operations described herein, according to example embodiments.

FIG. 5A illustrates an example physical infrastructure configured to perform various operations on the blockchain in accordance with one or more of the example methods of operation according to example embodiments. Referring to FIG. 5A, the example configuration 500 includes a physical infrastructure 510 with a blockchain 520 and a smart contract 540, which may execute any of the operational steps 512 included in any of the example embodiments. The steps/operations 512 may include one or more of the steps described or depicted in one or more flow diagrams and/or logic diagrams. The steps may represent output or written information that is written or read from one or more smart contracts 540 and/or blockchains 520 that reside on the physical infrastructure 510 of a computer system configuration. The data can be output from an executed smart contract 540 and/or blockchain 520. The physical infrastructure 510 may include one or more computers, servers, processors, memories, and/or wireless communication devices.

Figure 5B:
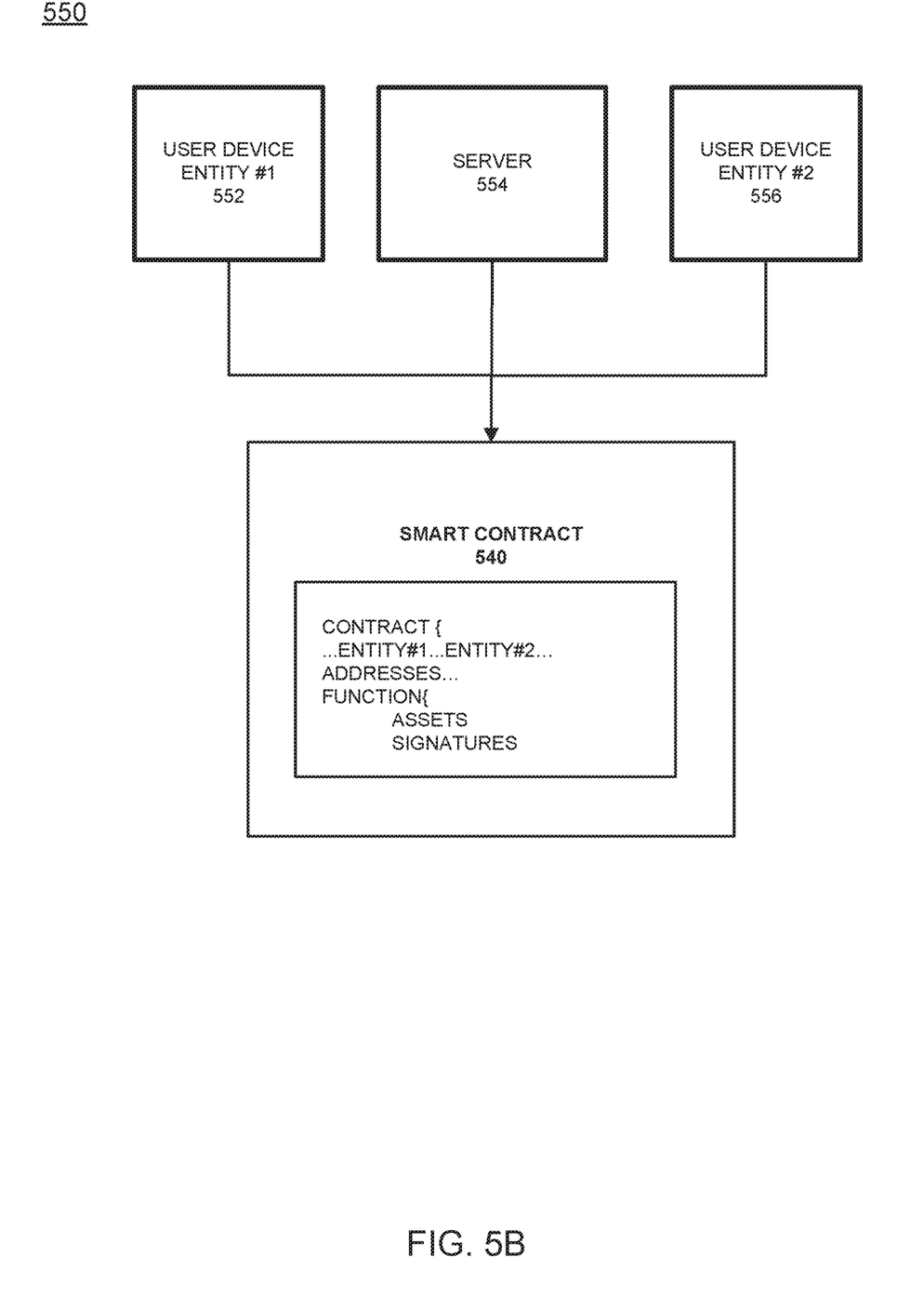
FIG. 5B illustrates an example smart contract configuration among contracting parties and a mediating server configured to enforce smart contract terms on a blockchain, according to example embodiments.

FIG. 5B illustrates an example smart contract configuration among contracting parties and a mediating server configured to enforce the smart contract terms on the blockchain according to example embodiments. Referring to FIG. 5B, the configuration 550B may represent a communication session, an asset transfer session or a process or procedure that is driven by a smart contract 540 which explicitly identifies one or more user devices 552 and/or 556. The execution, operations and results of the smart contract execution may be managed by a server 554. Content of the smart contract 540 may require digital signatures by one or more of the entities 552 and 556 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
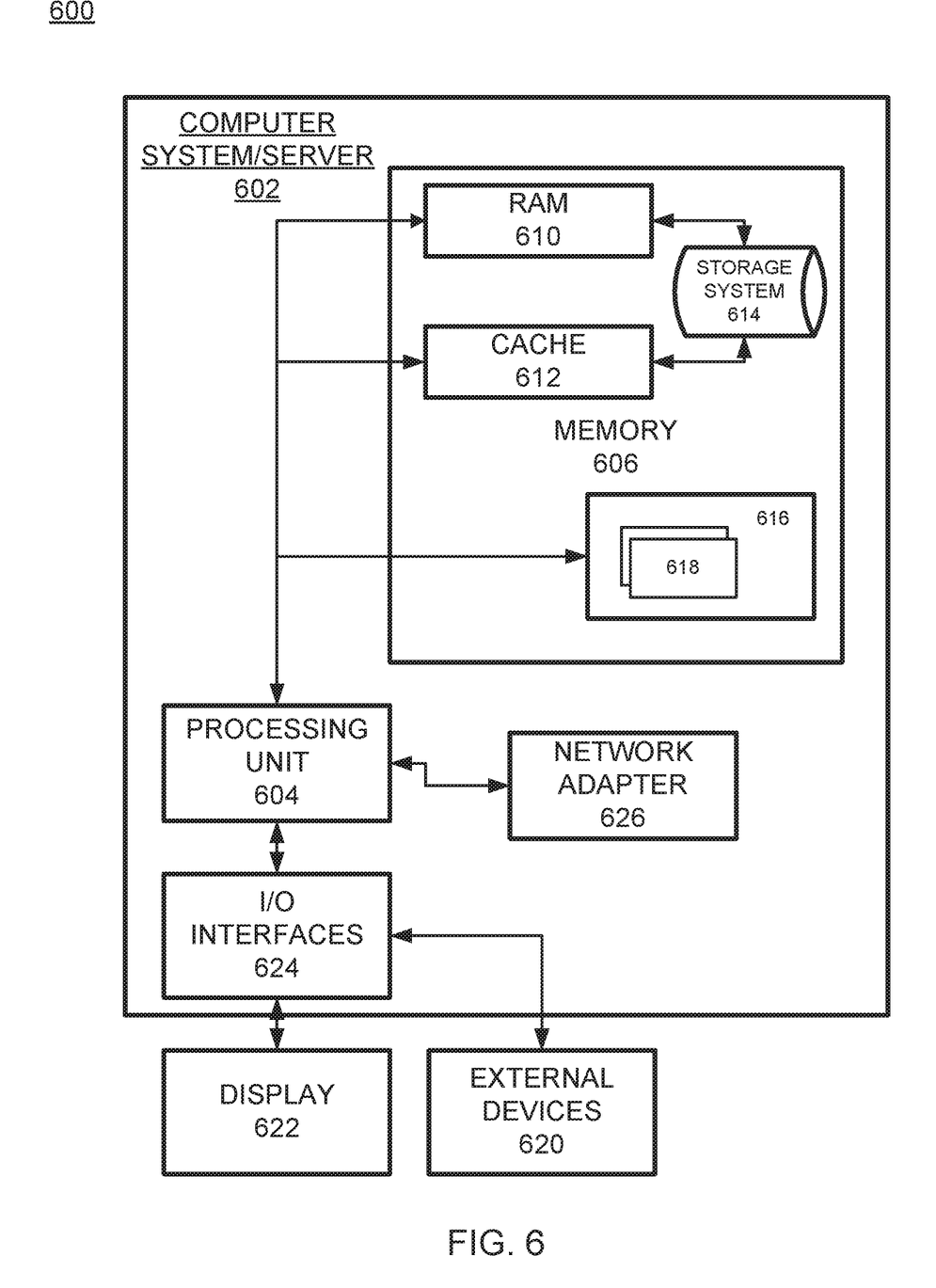
FIG. 6 illustrates an example computer system configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, IoT devices, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A hardware-implemented system for trace-based transaction validation and commitment in a network, the hardware-implemented system comprising:
   at least one hardware-implemented endorser peer configured to generate a binary trace during a simulation of a transaction, and to generate an endorsed trace based on a result of the simulation; and
   at least one hardware-implemented committer peer configured to validate the transaction based on an execution of a smart contract and a use of the endorsed trace as a witness;
   wherein a length of the binary trace is reduced using a length reduction technique, by the at least one hardware-implemented endorser peer configured to perform one or more of:
     exclude, from the binary trace, conditions that are unnecessary depending on their state, and
     apply a compression algorithm to the binary trace.

2. The hardware-implemented system of claim 1, wherein, when the at least one hardware-implemented endorser peer is to generate a binary trace, the at least one hardware-implemented endorser peer is further to:
   assign, for each condition of the transaction, in the binary trace, that holds, a value of 1; and
   assign, for each condition of the transaction, in the binary trace, that does not hold, a value of 0.

3. The hardware-implemented system of claim 1, wherein, when the at least one hardware-implemented endorser peer is to generate a binary trace, the at least one hardware-implemented endorser peer is further to:
   assign, for each condition of the transaction, in the binary trace, that holds, a value of 0; and
   assign, for each condition of the transaction, in the binary trace, that does not hold, a value of 1.

4. The hardware-implemented system of claim 1, wherein, when an evaluation of the transaction by the at least one hardware-implemented committer peer fails validation, the at least one hardware-implemented committer peer is configured to invalidate the transaction.

5. The hardware-implemented system of claim 1, wherein, when the execution of the smart contract by the at least one hardware-implemented committer peer finishes successfully, the at least one hardware-implemented committer peer is configured to commit changes in the transaction to a ledger.

6. The hardware-implemented system of claim 1, wherein the trace-based transaction validation and commitment is employed in conjunction with a different validation approach for transactions.

7. The hardware-implemented system of claim 1, wherein the transaction comprises:
   a plurality of conditions, and
   wherein the binary trace includes a trace of all branches of the plurality of conditions.

8. The hardware-implemented system of claim 1, wherein the at least one hardware-implemented endorser peer is further configured to:
   reduce a length of the binary trace using a length reduction technique.

9. The hardware-implemented system of claim 8, wherein, when the at least one hardware-implemented endorser peer is to implement the length reduction technique, the at least one hardware-implemented endorser peer is to:
   exclude, from the binary trace, values for conditions that are unnecessary depending on their state.

10. The hardware-implemented system of claim 8, wherein, when the at least one hardware-implemented endorser peer is to implement the length reduction technique, the at least one hardware-implemented endorser peer is to:
    apply a compression algorithm to the binary trace.

11. A computer-implemented method for trace-based transaction validation and commitment in a network, the method comprising:
    generating, by at least one endorser peer, a binary trace during a simulation of a transaction, and an endorsed trace based on a result of the simulation;
    validating, by at least one committer peer, the transaction based on executing a smart contract and using the endorsed trace as a witness;
    committing, by the at least one committer peer, changes in the transaction to a ledger based on the transaction being validated;

wherein a length of the binary trace is reduced, by the at least one endorser peer, using a length reduction technique comprising one or more of:
excluding, from the binary trace, conditions that are unnecessary depending on their state, and
applying a compression algorithm to the binary trace.

12. The computer-implemented method of claim 11, wherein the generating a binary trace further comprises:
assigning, for each condition of the transaction, in the binary trace, that holds, a value of 1; and
assigning, for each condition of the transaction, in the binary trace, that does not hold, a value of 0.

13. The computer-implemented method of claim 11, wherein the generating a binary trace further comprises:
assigning, for each condition of the transaction, in the binary trace, that holds, a value of 0; and
assigning, for each condition of the transaction, in the binary trace, that does not hold, a value of 1.

14. The computer-implemented method of claim 11, further comprising:
performing the trace-based transaction validation and commitment in conjunction with a different validation approach.

15. The computer-implemented method of claim 11, wherein the transaction comprises a plurality of conditions, and
wherein the generating a binary trace further comprises:
tracing of all branches of the plurality of conditions.

16. A computer-implemented method for trace-based transaction validation and commitment in a network, comprising:
generating, by at least one endorser peer, a binary trace during simulation of a transaction resulting in an endorsed trace;
reducing, by the at least one endorser peer, a length of the binary trace using a length reduction technique;
communicating, by the at least one endorser peer, the transaction to at least one committer peer for validation, by executing a smart contract and using the endorsed trace as a witness, and for committing changes in the transaction to a ledger when the transaction is validated;
wherein a length of the binary trace is reduced, by the at least one endorser peer, using a length reduction technique comprising one or more of:
excluding, from the binary trace, conditions that are unnecessary depending on their state, and
applying a compression algorithm to the binary trace.

17. The computer-implemented method of claim 16, wherein the length reduction technique comprises one or more of:
excluding, from the binary trace, conditions that are unnecessary depending on their state, and
applying a compression algorithm to the binary trace.

18. The computer-implemented method of claim 16, further comprising:
performing the trace-based transaction validation and commitment in conjunction with a different validation approach.

19. The computer-implemented method of claim 16, wherein the transaction comprises a plurality of conditions, and
wherein the generating a binary trace further comprises:
tracing of all branches of the plurality of conditions.

* * * * *